(12) United States Patent
Watamura et al.

(10) Patent No.: US 11,016,530 B2
(45) Date of Patent: May 25, 2021

(54) PORTABLE INFORMATION DEVICE

(71) Applicant: LENOVO (SINGAPORE) PTE. LTD., Singapore (SG)

(72) Inventors: Kenji Watamura, Yokohama (JP); Chi-Hui Chen, Taipei (TW)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 16/777,946

(22) Filed: Jan. 31, 2020

(65) Prior Publication Data
US 2021/0011513 A1 Jan. 14, 2021

(30) Foreign Application Priority Data

Jul. 12, 2019 (JP) .............................. JP2019-130604

(51) Int. Cl.
*G06F 1/16* (2006.01)
(52) U.S. Cl.
CPC .......... *G06F 1/1616* (2013.01); *G06F 1/1641* (2013.01); *G06F 1/1652* (2013.01); *G06F 1/1681* (2013.01)
(58) Field of Classification Search
CPC .... G06F 1/1616; G06F 1/1652; G06F 1/1681; G06F 1/1641
See application file for complete search history.

(56) References Cited

U.S. PATENT DOCUMENTS

| 1,797,802 | A | * | 3/1931 | Soss | ........................... | E05D 3/16 |
| | | | | | | 16/369 |
| 1,810,508 | A | * | 6/1931 | Walter | ....................... | E05D 3/16 |
| | | | | | | 16/369 |
| 2,021,702 | A | * | 11/1935 | Soss | ........................... | E05D 3/16 |
| | | | | | | 16/369 |
| 5,044,044 | A | * | 9/1991 | Young | ....................... | A63C 5/02 |
| | | | | | | 16/323 |
| 6,829,808 | B2 | * | 12/2004 | Neukotter | ............... | E05D 3/186 |
| | | | | | | 16/366 |
| 7,032,984 | B2 | * | 4/2006 | Kim | ....................... | G06F 1/1601 |
| | | | | | | 312/223.2 |

(Continued)

FOREIGN PATENT DOCUMENTS

| JP | 2018112835 A | 7/2018 |
| JP | 2018116467 A | 7/2018 |

(Continued)

*Primary Examiner* — Adrian S Wilson
*Assistant Examiner* — Theron S Milliser
(74) *Attorney, Agent, or Firm* — Shimokaji IP

(57) ABSTRACT

A portable information device includes a hinge device, a foldable display, and a bezel member. The hinge device has a first base plate fixed to the first chassis, a second base plate fixed to the second chassis, a first link arm having a first end portion rotatably connected to the first base plate through a first shaft, a second link arm having a first end portion rotatably connected to the second base plate through a second shaft, and a coupling plate having a first end portion rotatably connected to a second end portion of the first link arm through a third shaft and a second end portion rotatably connected to a second end portion of the second link arm through a fourth shaft. The hinge device as a whole is disposed under a display surface, regardless of opening/closing state of the second chassis with respect to the first chassis.

5 Claims, 9 Drawing Sheets

(56) References Cited

U.S. PATENT DOCUMENTS

| | | | | |
|---|---|---|---|---|
| 8,787,016 B2* | 7/2014 | Rothkopf | | G06F 1/1681 |
| | | | | 361/679.55 |
| 8,971,031 B2* | 3/2015 | Mok | | G06F 1/1656 |
| | | | | 361/679.27 |
| 9,013,864 B2* | 4/2015 | Griffin | | H04M 1/0235 |
| | | | | 361/679.21 |
| 9,348,450 B1 | 5/2016 | Kim | | |
| 9,535,452 B2* | 1/2017 | Ahn | | H05K 5/0017 |
| 9,557,771 B2* | 1/2017 | Park | | G06F 1/1641 |
| 10,303,223 B2* | 5/2019 | Park | | F16C 11/04 |
| 10,310,551 B2* | 6/2019 | Bae | | G06F 1/16 |
| 10,365,691 B2* | 7/2019 | Bae | | G06F 1/1616 |
| 10,365,692 B2* | 7/2019 | Yeh | | G06F 1/1616 |
| 10,481,634 B2* | 11/2019 | Mizoguchi | | G06F 1/1637 |
| 10,491,725 B1* | 11/2019 | Harmon | | H04B 1/3888 |
| 10,495,941 B2* | 12/2019 | Hashimoto | | G02F 1/13338 |
| 10,564,682 B1* | 2/2020 | Wu | | F16C 11/04 |
| 10,761,573 B2* | 9/2020 | Hsu | | G06F 1/1681 |
| 10,761,574 B1* | 9/2020 | Hsu | | E05D 7/00 |
| 10,775,852 B2* | 9/2020 | Kim | | H05K 5/0017 |
| 2004/0264118 A1* | 12/2004 | Karidis | | G06F 1/1683 |
| | | | | 361/679.55 |
| 2011/0063783 A1* | 3/2011 | Shim | | G06F 1/1681 |
| | | | | 361/679.01 |
| 2012/0236484 A1* | 9/2012 | Miyake | | G06F 1/1616 |
| | | | | 361/679.01 |
| 2012/0264489 A1* | 10/2012 | Choi | | H04M 1/0268 |
| | | | | 455/566 |
| 2013/0021762 A1* | 1/2013 | van Dijk | | H05K 5/0226 |
| | | | | 361/749 |
| 2013/0037228 A1* | 2/2013 | Verschoor | | G06F 1/1652 |
| | | | | 160/377 |
| 2014/0042293 A1* | 2/2014 | Mok | | G06F 1/1652 |
| | | | | 248/682 |
| 2014/0126121 A1* | 5/2014 | Griffin | | H04M 1/0216 |
| | | | | 361/679.01 |
| 2016/0085265 A1* | 3/2016 | Park | | G06F 1/1681 |
| | | | | 361/807 |

FOREIGN PATENT DOCUMENTS

| | | |
|---|---|---|
| JP | 2018185725 A | 11/2018 |
| WO | 2015191411 A1 | 12/2015 |

* cited by examiner

PORTABLE INFORMATION DEVICE

FIELD OF THE INVENTION

The present invention relates to a foldable portable information device.

BACKGROUND OF THE INVENTION

In recent years, portable information devices, such as a tablet PC and a smartphone having a touch panel type liquid crystal display and not having a physical keyboard, have rapidly spread. The display of this kind of portable information device has been desired to be large in use but has been desired to be miniaturized in carrying. Then, the present applicant has proposed a portable information device in which not only a chassis but also a display is configured so as to be foldable by the use of a flexible display, such as organic EL (Electro Luminescence) (for example, refer to Japanese Patent No. 6,507,183).

SUMMARY OF THE INVENTION

A configuration of the above-described Japanese Patent No. 6,507,183 enables smooth folding operation of a display by aligning a rotation center around which chassis are folded by a hinge device with a surface of the display. Thus, the hinge device was disposed in such a manner that a part of components protrudes above the surface of the display due to its structure. As a result, the hinge device was exposed on a top surface of the chassis to reduce appearance quality.

The present invention has been made considering the above-described problem of the prior art. It is an object of the present invention to provide a portable information device capable of suppressing reduction in appearance quality.

A portable information device according to the first aspect of the present invention is a portable information device, including a first chassis having one edge portion, a second chassis having one edge portion adjacent to the one edge portion of the first chassis, a hinge device rotatably connecting the one edge portions of the first chassis and the second chassis in such a manner that the second chassis is opened/closed with respect to the first chassis, a display seamlessly covering a display surface of the first chassis and the second chassis and being foldable, and a bezel member covering a portion of the display surface of the first chassis and the second chassis other than the display, in which the hinge device has a first base plate fixed to the first chassis, a second base plate fixed to the second chassis, a first link arm having a first end portion rotatably connected to the first base plate through a first shaft, a second link arm having a first end portion rotatably connected to the second base plate through a second shaft, and a coupling plate having a first end portion rotatably connected to a second end portion of the first link arm through a third shaft and a second end portion rotatably connected to a second end portion of the second link arm through a fourth shaft, and in which the hinge device as a whole is disposed under the display surface, regardless of opening/closing state of the second chassis with respect to the first chassis.

With such a configuration, the coupling plate moves so as to separate from a bending region of the display in the folding operation of the chassis. Thus, the portable information device can prevent the hinge device from interfering with the bezel member or the display when folded, even when the hinge device is disposed under the display surface. Thus, the portable information device can suppress reduction in appearance quality due to exposure of the hinge device to a top surface of the chassis.

The hinge device may further include a first gear arm having a first end portion rotatably connected to the first base plate through a fifth shaft, a second end portion rotatably connected to the coupling plate through a sixth shaft, and a first gear provided around the sixth shaft; and a second gear arm having a first end portion rotatably connected to the second base plate through a seventh shaft, a second end portion rotatably connected to the coupling plate through an eighth shaft, and a second gear provided around the eighth shaft, the second gear engaging with the first gear. Then, because right and left chassis of the portable information device synchronously rotate, the stability in a rotating operation can be improved.

The hinge device may be disposed at a position under the bezel member and beside the display, in the display surface. Then, since the hinge device is disposed at a position closer to the display, its thickness can be made thinner.

The hinge device may be disposed under the display.

The hinge device may connect the first chassis and the second chassis in such a manner that the first chassis and the second chassis are foldable from a usage form in which a top surface of the first chassis and a top surface of the second chassis face the same direction and are parallel to each other to a storage form in which the top surfaces of the first chassis and the second chassis face each other, and the coupling plate may be stored inside the first chassis and the second chassis in the usage form, and may project outward from an end surface of the one edge portions of the first chassis and the second chassis in the storage form.

It may further include a first bracket fixing the first base plate and the first chassis, and a second bracket fixing the second base plate and the second chassis.

According to the above-described aspects, the reduction in appearance quality can be suppressed.

DETAILED DESCRIPTION OF THE INVENTION

Hereinafter, a preferable embodiment of a portable information device according to the present invention is described in detail with reference to the attached drawings.

Figure 1:
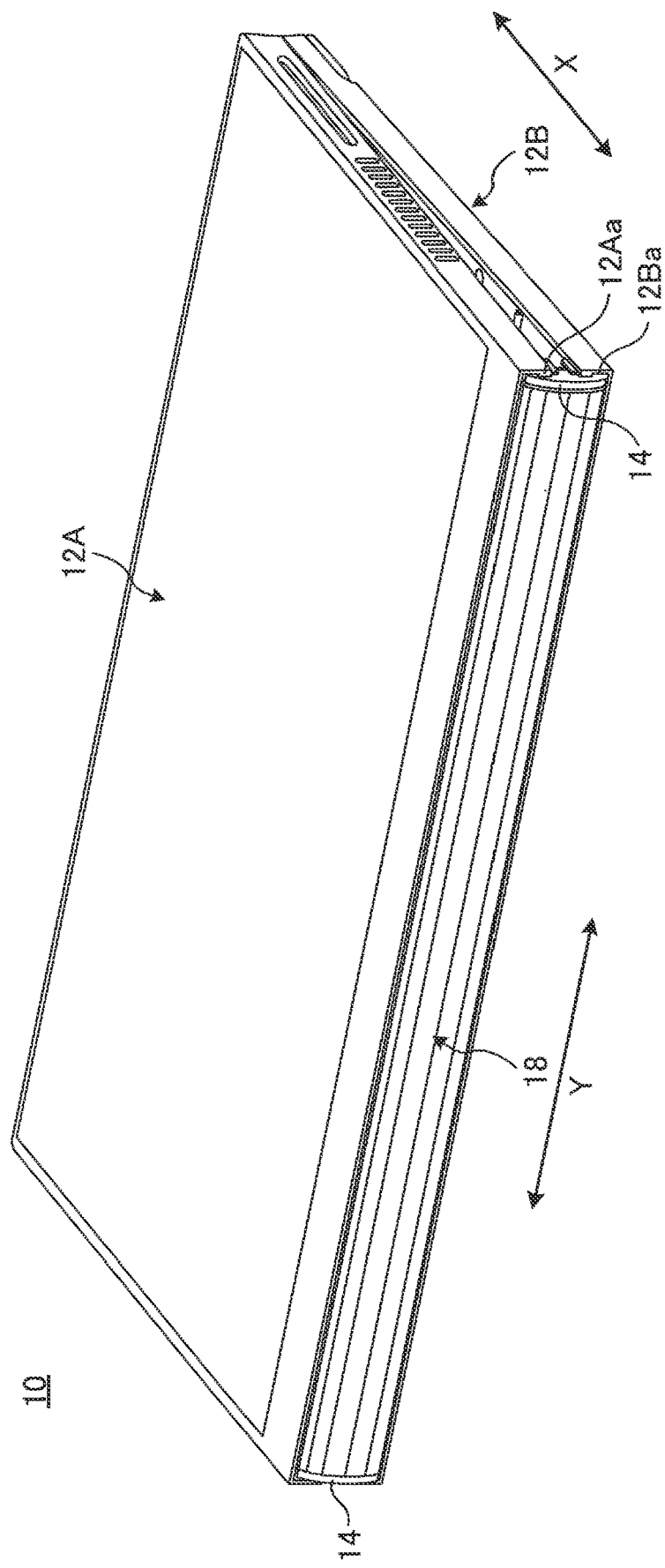
FIG. 1 is a perspective view illustrating a state where a portable information device according to one embodiment is closed into a storage form.
Figure 2:
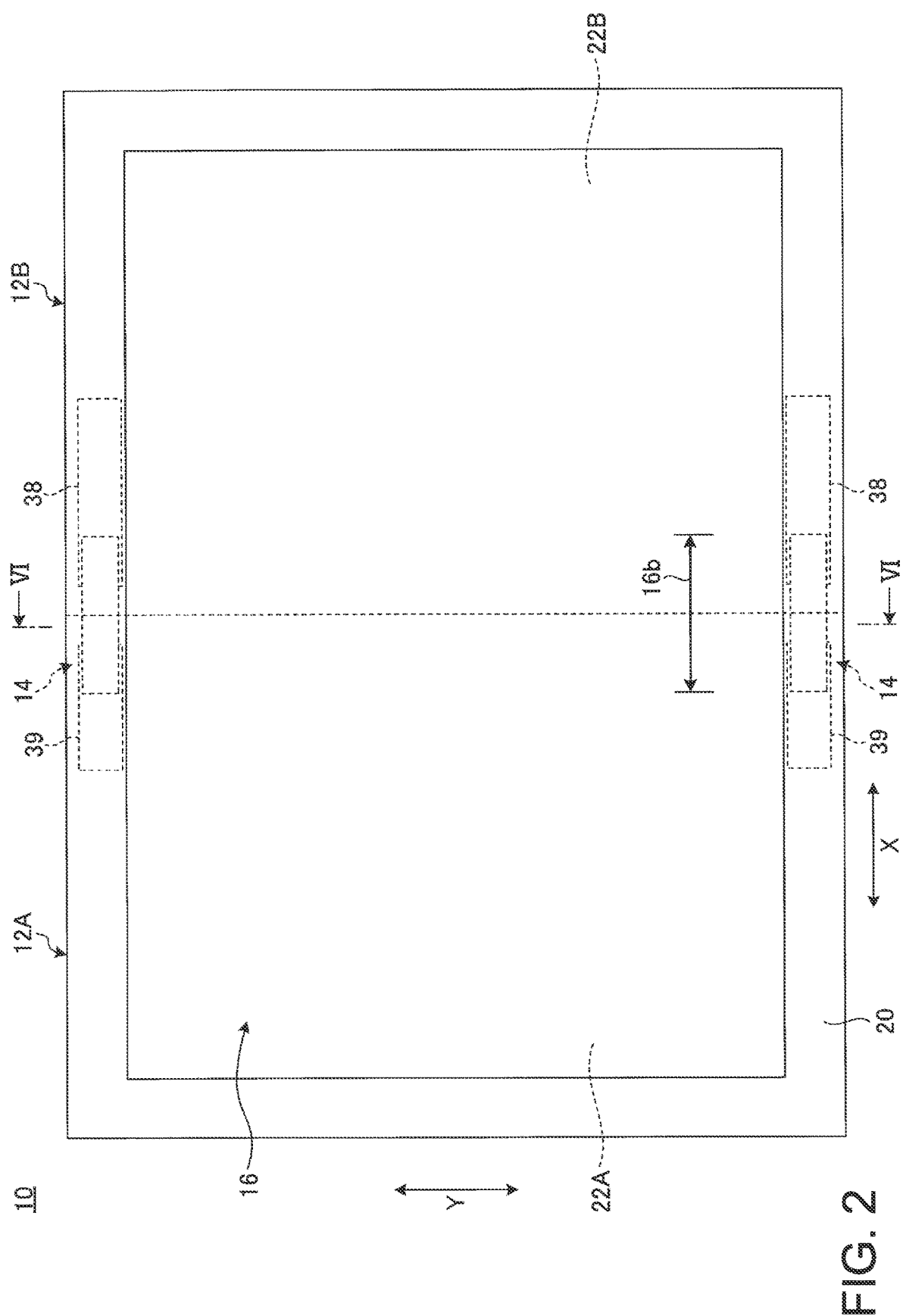
FIG. 2 is a plan view schematically illustrating a state where the portable information device illustrated in FIG. 1 is opened into a usage form.
Figure 3:
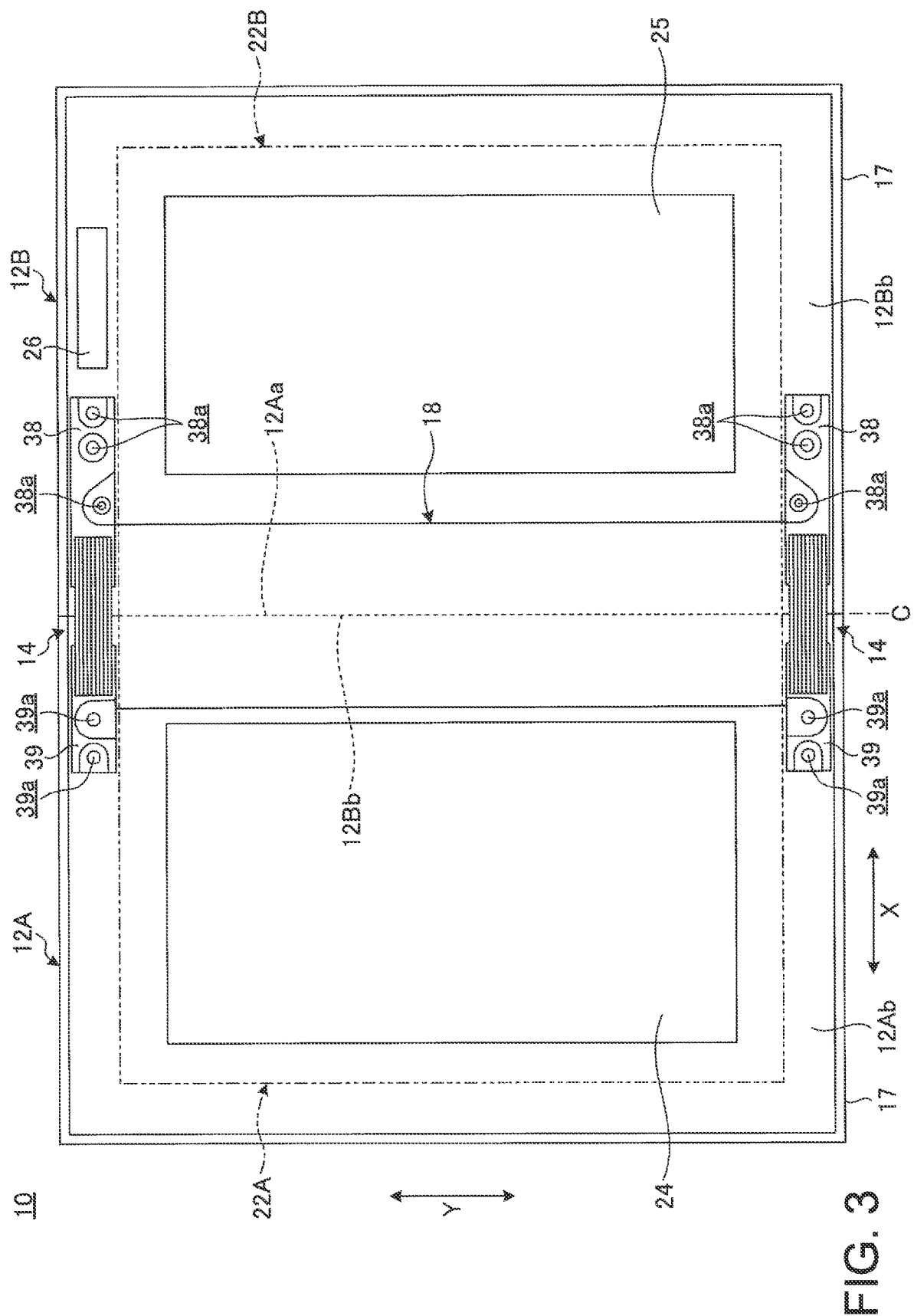
FIG. 3 is a plan view schematically illustrating the internal structure of the portable information device illustrated in FIG. 2.
Figure 4:
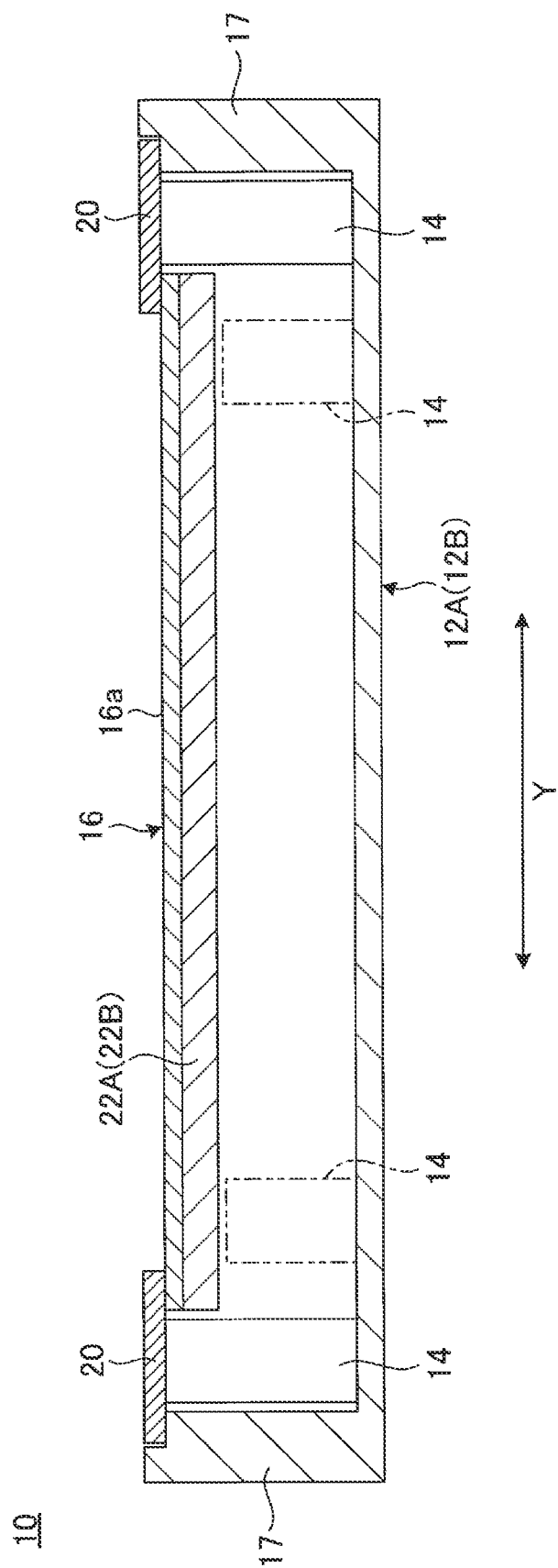
FIG. 4 is a schematic cross-sectional view along the IV-IV line in FIG. 2.

FIG. 1 is a perspective view illustrating a state where a portable information device 10 according to one embodiment is closed into a storage form (state). FIG. 2 is a plan view schematically illustrating a state where the portable information device 10 illustrated in FIG. 1 is opened into a usage form (state). FIG. 3 is a plan view schematically illustrating the internal structure of the portable information device 10 illustrated in FIG. 2. FIG. 4 is a schematic cross-sectional view along the IV-IV line in FIG. 2.

As illustrated in FIG. 1 to FIG. 3, the portable information device 10 includes a first chassis 12A, a second chassis 12B, a hinge device 14, and a display 16. The portable information device 10 according to the present embodiment is a tablet PC foldable like a book. The portable information device 10 may be a cellular phone, a smartphone, an electronic notebook, a portable game console, etc.

The chassis 12A and 12B are each rectangular flat box body in which side plates 17 are formed so as to be raised on four peripheries of the bottom plate (refer to FIG. 3) and the display 16 is disposed on an opened top surface. The chassis 12A and 12B are each composed of metal plates of stainless steel, magnesium, and aluminum etc., fiber reinforced resin plates containing reinforced fibers, such as carbon fibers, or the like, for example.

The chassis 12A and 12B are disposed adjacent to each other. The chassis 12A and 12B are connected through a pair of hinge devices 14 and 14 provided in both end portions in the Y direction of one edge portions 12Aa and 12Ba as edge portions adjacent to each other. The hinge devices 14 rotatably connect the one edge portions 12Aa and 12Ba of the first chassis 12A and the second chassis 12B so that the second chassis 12B is opened and closed with respect to the first chassis 12A. The chassis 12A and 12B are rotatably connected by the hinge devices 14. The chassis 12A and 12B can be moved to a desired angular position between the storage form illustrated in FIG. 1 and the usage form illustrated in FIG. 2. A line C illustrated by the dashed-dotted line in FIG. 3 represents a bending center C serving as the center of a folding operation of the chassis 12A and 12B. In the storage form illustrated in FIG. 1, the one edge portions 12Aa and 12Ba of the chassis 12A and 12B are greatly separated from each other. Then, a boundary portion between the one edge portions 12Aa and 12Ba is covered by a backbone member 18.

Hereinafter, as illustrated in FIG. 1 to FIG. 3, the portable information device 10 is described designating a direction in which the chassis 12A and 12B are arranged as an X direction and a longitudinal direction of the backbone member 18 perpendicular to the X direction as a Y direction.

As illustrated in FIG. 1 and FIG. 3, the backbone member 18 is attached to inner surfaces 12Ab and 12Bb of the chassis 12A and 12B. The backbone member 18 is a sheet-like member of an accordion shape. One end portion in the X direction of the backbone member 18 is fixed to the first chassis 12A and the other end portion in the X direction is slidably supported by the second chassis 12B, for example.

The display 16 is a touch panel type liquid crystal display, for example. The display 16 is a flexible display, such as an organic EL having a paper structure with high flexibility, for example. The display 16 seamlessly covers display surfaces of the first chassis 12A and the second chassis 12B and is opened/closed with an opening/closing operation of the chassis 12A and 12B. A bezel member 20 is disposed on an outer peripheral edge portion of the surface (display surface) 16a of the display 16 (refer to FIG. 2). The bezel member 20 is a frame-shaped sheet-like member having flexibility. The bezel member 20 covers a non-displaying region (inactive region) of the outer peripheral edge portion excluding a display region (active region) of the surface 16a of the display 16. As illustrated in FIG. 4, the bezel member 20 is attached so as to straddle the side plates 17 of the chassis 12A and 12B and the outer peripheral edge portion of the surface 16a of the display 16. Thus, the bezel member 20 covers a portion of the display surfaces of the first chassis 12A and the second chassis 12B other than the display 16.

The display 16 is provided over inner surfaces 12Ab and 12Bb of the chassis 12A and 12B. The display 16 is supported with respect to the inner surfaces 12Ab and 12Bb through a first support plate 22A and a second support plate 22B (refer to FIG. 3 and FIG. 4). As illustrated by the dashed-two dotted line in FIG. 3, the support plates 22A and 22B are each a thin plate member formed into a rectangular shape. The first support plate 22A is fixed to the first chassis 12A. The second support plate 22B is fixed to the second chassis 12B. The display 16 is fixed to top surfaces of the support plates 22A and 22B using a double-sided tape, or the like. In the display 16, a belt-like region overlapping with the hinge devices 14 serves as a bending region 16b. The bending region 16b is not fixed with respect to the support plates 22A and 22B and is in a relatively movable state (refer to FIG. 7B and FIG. 7C).

The chassis 12A and 12B contain a substrate 24 mounted with various types of semiconductor chips, a battery device 25, an antenna device 26, as well as various types of electronic components, and a cooling device etc., for example. These electronic components etc. are contained in a space formed between the inner surfaces 12Ab and 12Bb and the support plates 22A and 22B.

Figure 5:
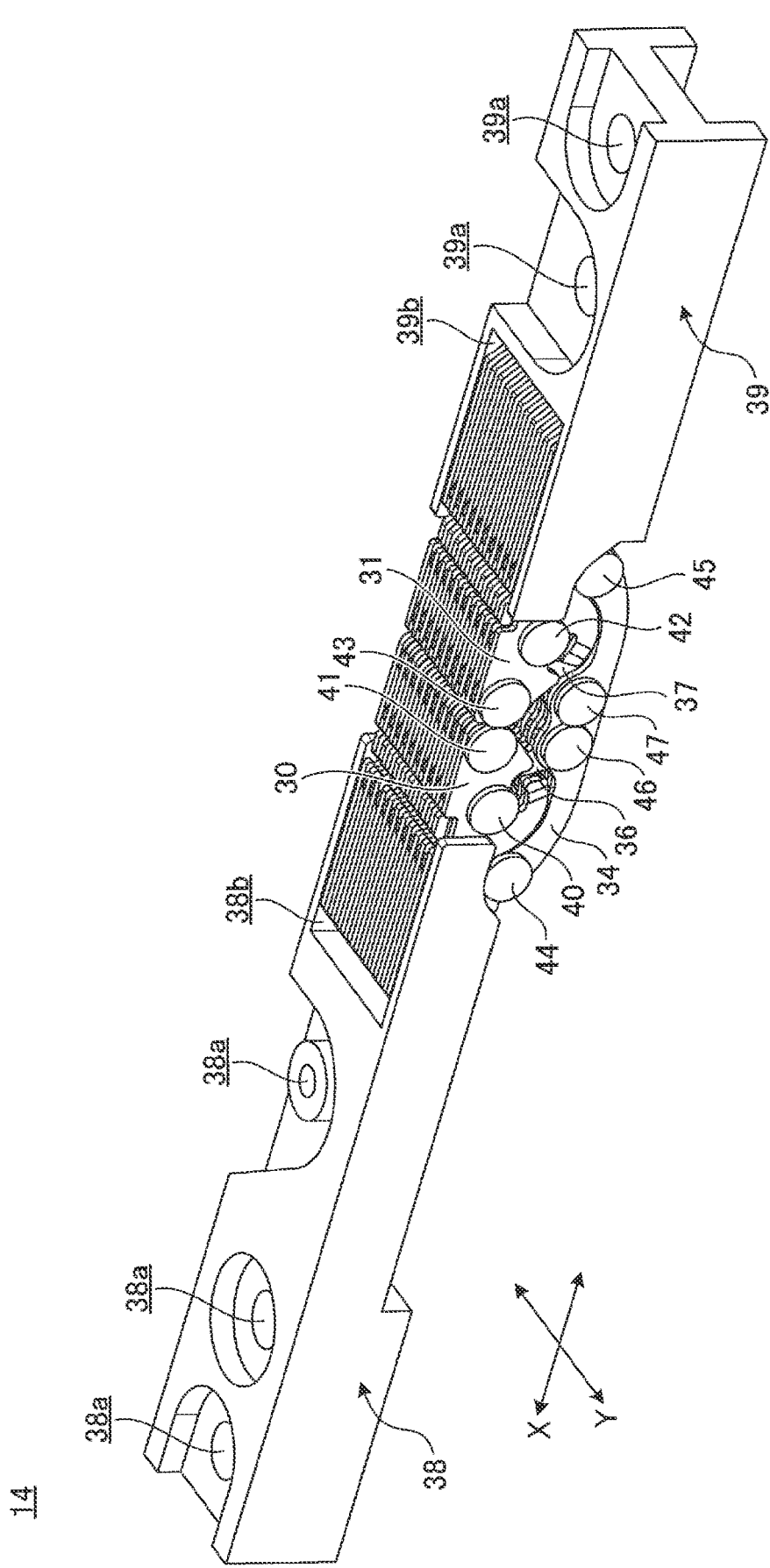
FIG. 5 is a perspective view of the hinge device.
Figure 6:
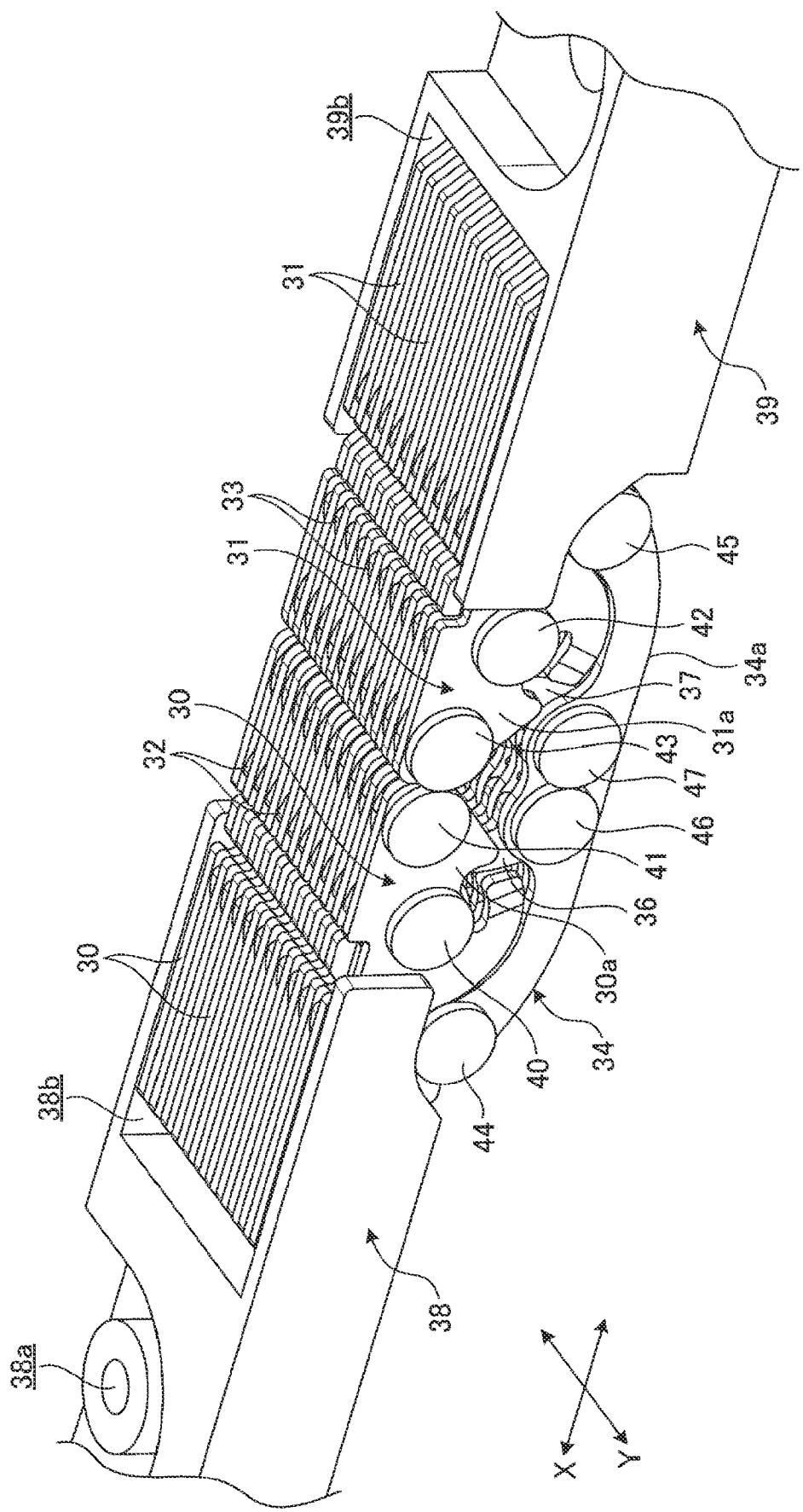
FIG. 6 is a perspective view enlarging a part of the hinge device illustrated in FIG. 5.
Figure 7A:
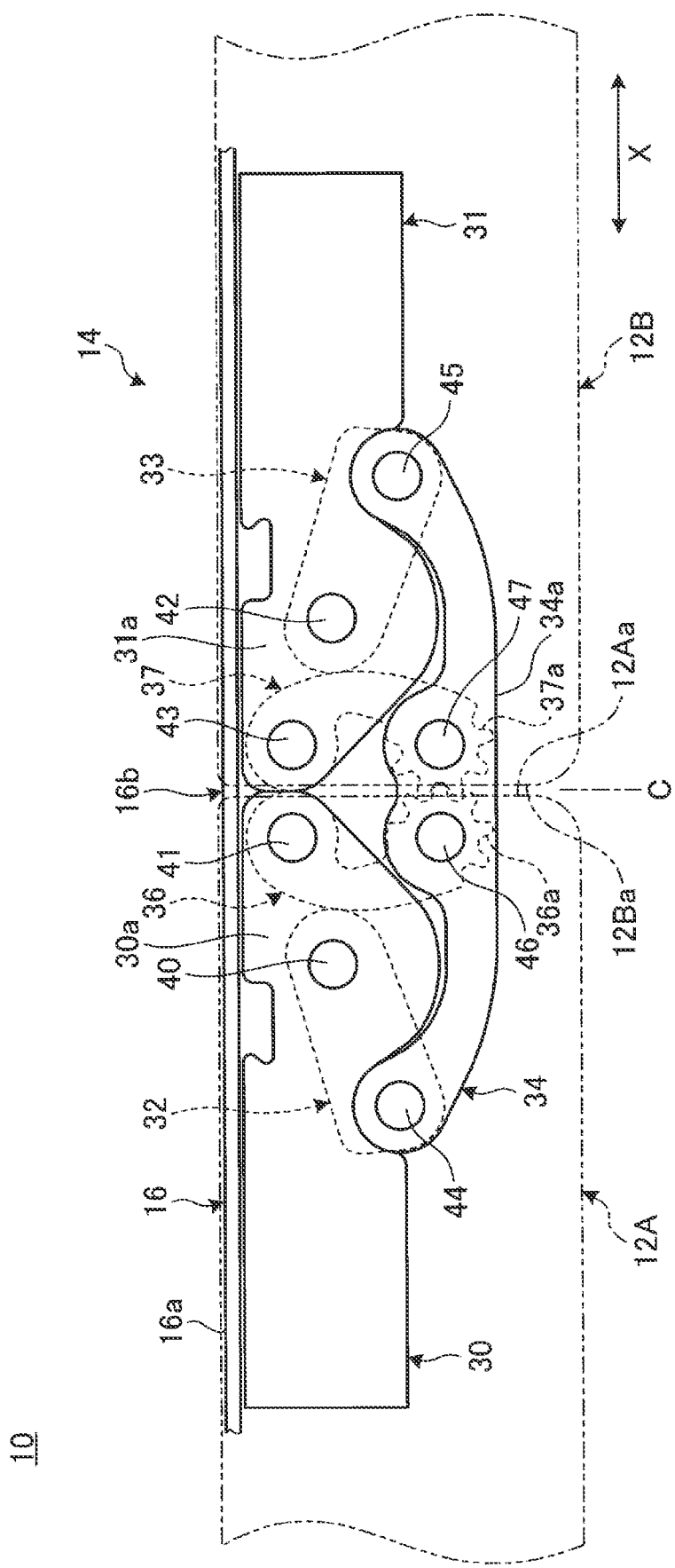
FIG. 7A is a side view schematically illustrating a state of the hinge device in the usage form.
Figure 7B:
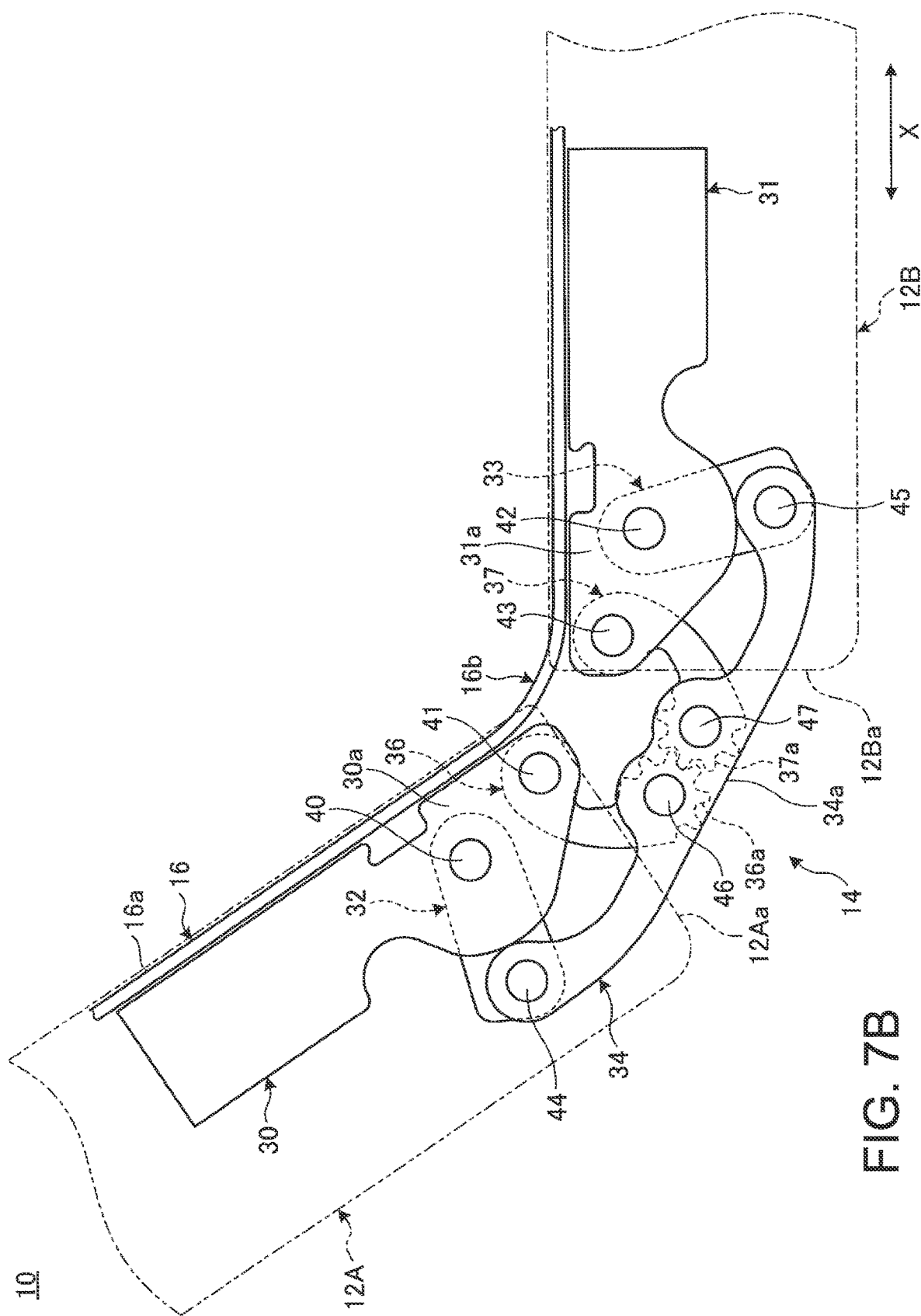
FIG. 7B is a side view schematically illustrating a state where the hinge device is operated so as to be folded from the state illustrated in FIG. 7A.
Figure 7C:
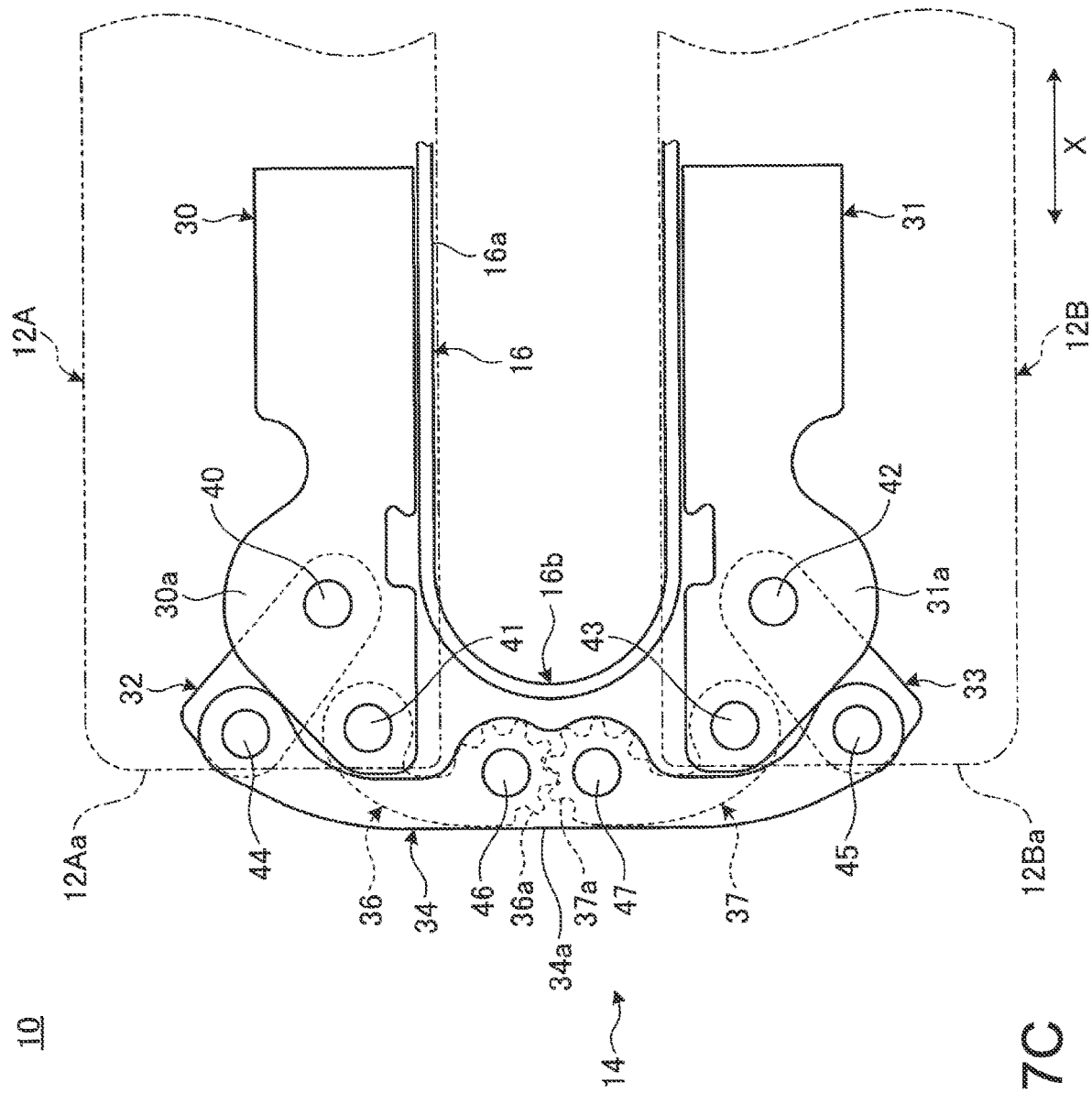
FIG. 7C is a side view schematically illustrating a state where the hinge device is further operated so as to be folded from the state illustrated in FIG. 7B into the storage form.

Next, a specific example of the configuration of the hinge device 14 is described. FIG. 5 is a perspective view of the hinge device 14. FIG. 6 is a perspective view enlarging a part of the hinge device 14 illustrated in FIG. 5. FIG. 7A to FIG. 7C are views illustrating an operation of folding the hinge device 14 from the usage form to the storage form. FIG. 7A is a side view schematically illustrating a state of the hinge device 14 in the usage form. FIG. 7B is a side view schematically illustrating a state where the hinge device 14 is operated so as to be folded from the state illustrated in FIG. 7A. FIG. 7C is a side view schematically illustrating a state where the hinge device 14 is further operated so as to be folded from the state illustrated in FIG. 7B into the storage form.

As illustrated in FIG. 4, the hinge devices 14 are each disposed at a position beside the outer peripheral edge portion of the display 16 and under the bezel member 20. The hinge device 14 according to the present embodiment rotates the chassis 12A and 12B so that the surface 16a of the display 16 can be always moved along a preset opening/closing track.

As illustrated in FIG. 5, FIG. 6, and FIG. 7A, the hinge device 14 includes a first base plate 30, a second base plate 31, a first link arm 32, a second link arm 33, a coupling plate 34, a first gear arm 36, and a second gear arm 37. The hinge device 14 further includes a first bracket 38, and a second bracket 39. The hinge device 14 supports these respective elements through shafts 40 to 47 serving as rotation shafts. Hereinafter, a positional relationship among each element is described based on the configuration of the hinge device 14 in the usage form illustrated in FIG. 7A, except as otherwise described.

As illustrated in FIG. 3 and FIG. 5, the first bracket 38 is an attaching bracket of the hinge device 14 for the second chassis 12B and is made of block-shaped metal. The first bracket 38 is screwed to the inner surface 12Bb through a plurality of fastening holes 38a formed at various locations, for example. The second bracket 39 is an attaching bracket of the hinge device 14 for the first chassis 12A and is made of block-shaped metal or resin. The second bracket 39 is screwed to the inner surface 12Ab through a plurality of fastening holes 39a formed at various locations, for example. The brackets 38 and 39 each have recessed portions 38b and 39b, respectively, at end faces facing each other. In the case of the present embodiment, some fastening holes 39a and some fastening holes 38a are used for attaching the support plates 22A and 22B, respectively.

As illustrated in FIG. 6 and FIG. 7A, the first base plate 30 is a thin metallic plate. A plurality of the first base plates 30 are provided side by side in a plate thickness direction at an interval equal to a plate thickness of the first link arm 32 or the first gear arm 36. The first link arm 32 and the first gear arm 36 are sandwiched in a slidable state between the adjacent first base plates 30 and 30. One end side of the first base plate 30 is fixed to the first bracket 38 within the recessed portion 38b and the other end side of the first base plate 30 projects outside the recessed portion 38b. The first base plate 30 has a distal end part 30a projecting outside the recessed portion 38b which part has a substantially tapered triangular shape in a side view. A first shaft 40 and a fifth shaft 41 are pivotally supported on the distal end part 30a. The fifth shaft 41 is provided in a tip of the distal end part 30a. The first shaft 40 is provided in a position closer to the first bracket 38 and a little lower than the fifth shaft 41. Shapes of the base plates 30 and 31 can be changed as necessary. The shafts 40 to 47 are each a metallic shaft, for example.

The second base plate 31 has a structure symmetrical to that of the first base plate 30. That is, one end side of the second base plate 31 is fixed to the second bracket 39 within the recessed portion 39b and the other end side of the second base plate 31 projects outside the recessed portion 39b. A plurality of the second base plates 31 are also provided side by side in a plate thickness direction at an interval equal to a plate thickness of the second link arm 33 or the second gear arm 37. The second link arm 33 and the second gear arm 37 are sandwiched in a slidable state between the adjacent second base plates 31 and 31. A second shaft 42 and a seventh shaft 43 are pivotally supported on a distal end part 31a projecting outside the recessed portion 39b of the second base plate 31. The arrangement of each of the shafts 42 and 43 is also symmetrical to that of each of the shafts 40 and 41 in the first base plate 30.

The first link arm 32 is a thin metallic plate. A plurality of the first link arms 32 are provided side by side in a plate thickness direction at an interval equal to a plate thickness of the first base plate 30. The first link arm 32 is a rectangular plate and gradually slopes downward from a first end portion on the first shaft 40 side toward a second end portion on the opposite side. Shapes of the link arms 32 and 33 can be changed as necessary. The first link arm 32 is disposed side by side with the first gear arm 36 in the same plane and is sandwiched between the adjacent first base plates 30 and 30. The first end portion of the first link arm 32 on one edge portion 12Aa side is rotatably connected to the first base plate 30 through the first shaft 40. The second end portion of the first link arm 32 on the opposite side to the first end portion is rotatably connected to the coupling plate 34 through a third shaft 44. That is, the first link arm 32 connects the coupling plate 34 to be movable relatively to the first base plate 30 fixed to the first chassis 12A through the first bracket 38.

The second link arm 33 has a structure symmetrical to that of the first link arm 32. That is, a first end portion of the second link arm 33 is rotatably connected to the second base plate 31 through the second shaft 42 and a second end portion of the second link arm 33 is rotatably connected to the coupling plate 34 through the fourth shaft 45. That is, the second link arm 33 connects the coupling plate 34 to be movable relatively to the second base plate 31 fixed to the second chassis 12B through the second bracket 39. A plurality of the second link arms 33 are also provided side by side in a plate thickness direction at an interval equal to a plate thickness of the second base plate 31.

The coupling plate 34 is a metallic plate connecting the link arms 32 and 33 on the left and right sides. The coupling plate 34 is curved and substantially dish-shaped in a side view. An outer peripheral end surface 34a (bottom end surface in FIG. 7A) of the coupling plate 34 is disposed along the inner surface of the backbone member 18 in the storage form illustrated in FIG. 1. The coupling plate 34 is disposed in the same plane as each of the base plates 30 and 31 and is located under (outside) each of the base plates 30 and 31. A plurality of the coupling plates 34 are provided side by side in a plate thickness direction at an interval equal to a plate thickness of the first link arm 32 or the second link arm 33. A first end portion of the coupling plate 34 is rotatably connected to the first link arm 32 through the third shaft 44. A second end portion of the coupling plate 34 on the opposite side to the first end portion is rotatably connected to the second link arm 33 through the fourth shaft 45. A sixth shaft 46 and an eighth shaft 47 provided side by side on the left and right sides across the bending center C, are pivotally supported on the center portion of the coupling plate 34.

The first gear arm 36 is a metallic plate. The first gear arm 36 is substantially glasses-shaped in a side view. The first gear arm 36 extends vertically along an end surface of the one edge portion 12Aa of the first chassis 12A. The first gear arm 36 is disposed side by side with the first link arm 32 in the same plane and is sandwiched in a slidable state between the adjacent first base plates 30 and 30. The first gear arm 36 is located closer to the one edge portion 12Aa side than the first link arm 32. A plurality of the first gear arms 36 are provided side by side in a plate thickness direction at an interval equal to a plate thickness of the first base plate 30. A top end portion of the first gear arm 36 is rotatably connected to the first base plate 30 through the fifth shaft 41. A bottom end portion of the first gear arm 36 is rotatably connected to the coupling plate 34 through the sixth shaft 46. The first gear arm 36 has a first gear 36a on a circumferential end surface formed around the sixth shaft 46.

The second gear arm 37 has a structure symmetrical to that of the first gear arm 36. That is, a top end portion of the second gear arm 37 is rotatably connected to the second base plate 31 through the seventh shaft 43, and a bottom end portion of the second gear arm 37 is rotatably connected to the coupling plate 34 through the eighth shaft 47. A plurality of the second gear arms 37 are provided side by side in a plate thickness direction at an interval equal to a plate thickness of the second base plate 31. The second gear arm 37 has a second gear 37a on a circumferential end surface formed around the eighth shaft 47. The second gear 37a engages with the first gear 36a.

The first gear arm 36 and the second gear arm 37 synchronously rotate under the engaging action of each of the gears 36a and 37a. That is, when the first gear arm 36 rotates in the counterclockwise direction around the sixth shaft 46 as an axis of rotation from the state illustrated in FIG. 7A, for example, the second gear arm 37 rotates in the clockwise direction around the eighth shaft 47 as an axis of rotation, and thus both rotation operations are synchronized. Thus, the first gear arm 36 and the second gear arm 37 form a mechanism which synchronizes operations of each element (the first base plate 30 or the first link arm 32) on the first chassis 12A side and each element (the second base plate 31 or the second link arm 33) on the second chassis 12B side of the hinge device 14.

Thus, the hinge device 14 has a laminated structure in which a plurality of the first base plates 30 and the left halves of the coupling plates 34 are arranged side by side and the first link arms 32 and the first gear arms 36 are sandwiched between them, on the first chassis 12A side. The hinge device 14 has a laminated structure in which a plurality of the second base plates 31 and the right halves of the coupling plates 34 are arranged side by side and the second link arm 33 and the second gear arm 37 are sandwiched between them, on the second chassis 12B side. Then, the shafts 40 to 47 each penetrate through these laminated base plates 30 and 31, link arms 32 and 33, coupling plates 34, and gear arms 36 and 37 in a laminated direction and support them. In addition, it is a matter of course that shapes of the respective elements of the hinge device 14, that is, the base plates 30 and 31, the link arms 32 and 33, the coupling plate 34, the gear arms 36 and 37, and the brackets 38 and 39 may be changed as necessary.

Next, with reference to FIG. 7A to FIG. 7C, an operation of rotating the portable information device 10 from the usage form to the storage form is described.

In the hinge device 14, the first base plate 30 and the second base plate 31 are disposed in parallel side by side in the X direction in the usage form illustrated in FIG. 7A. In this state, tip surfaces of the distal end parts 30a and 31a of the respective base plates 30 and 31 come into contact with or are close to each other. In addition, the first link arm 32 is in a position of having rotated most in the clockwise direction around the first shaft 40 as an axis of rotation. Similarly, the second link arm 33 is in a position of having rotated most in the counterclockwise direction around the second shaft 42 as an axis of rotation. Thus, the coupling plate 34 is in the uppermost position where its left and right ends are pulled up by the link arms 32 and 33, respectively. It is to be noted that the first gear arm 36 is in a position having rotated most in the clockwise direction around the sixth shaft 46 as an axis of rotation. Similarly, the second gear arm 37 is in a position of having rotated most in the counterclockwise direction around the eighth shaft 47 as an axis of rotation.

Therefore, the hinge device 14 is made thinner in the usage form with the coupling plate 34 approaching closest to the bottom end portions of the respective base plates 30 and 31. Thus, the hinge device 14 is completely contained inside the chassis 12A and 12B in a side view.

Meanwhile, in order to ensure the visibility of the drawings, FIG. 7A to FIG. 7C illustrate that the display 16 is disposed above top end surfaces of the base plates 30 and 31. However, as illustrated in FIG. 4, in the hinge device 14 of the present embodiment, the top end surfaces of the base plates 30 and 31 are actually disposed above the display 16. Naturally, the display 16 may be disposed above the top end surfaces of the base plates 30 and 31, as illustrated in FIG. 7A etc.

Next, when the portable information device 10 is made from the usage form (180° position) to the storage form (0° position) illustrated in FIG. 7C, the chassis 12A and 12B are each grasped by left and right hands of a user, respectively, and are folded in a direction of closing the display 16.

As illustrated in FIG. 7A and FIG. 7B, the coupling plate 34 is then subject to a force to separate the shafts 44 and 45 on both left and right ends and a rotating force according to an angle between the chassis 12A and 12B. As a result, in the hinge device 14, the first link arm 32 rotates in the counterclockwise direction around the first shaft 40 as an axis of rotation in FIG. 7A. At the same time, the second link arm 33 rotates in the clockwise direction around the second shaft 42 as an axis of rotation in FIG. 7A. As a result, a horizontal central part and its surrounding part of the coupling plate 34 are pushed out in a direction of separating from the base plates 30 and 31. Thus, when the hinge device 14 rotates from the usage form to the storage form, the coupling plate 34 moves so as to gradually project outwards. That is, the coupling plate 34 moves in so as to fill a gap between the one edge portions 12Aa and 12Ba of the chassis 12A and 12B separated from each other and gradually separates from a rear surface of the bending region 16b of the display 16.

Thus, in the hinge device 14, the coupling plate 34 located on the rear surface side of the bending region 16b of the display 16 separates from the display 16 with the closing operation of the chassis 12A and 12B. That is, the hinge device 14 is configured to always move the surface 16a of the display 16 along a preset opening/closing track, as described above. Thus, in a folding operation, there are concerns that the coupling plate 34 located on the outer side than the display 16 comes close to and interferes with the display 16 due to a turning radius difference. In this regard, in the hinge device 14, since the coupling plate 34 moves in a direction of escaping from the display 16 in the folding operation, interference between both is prevented. As a result, the hinge device 14 can smoothly bend the bending region 16b of the display 16 while maintaining a desired curvature and can prevent the occurrence of a failure of the display 16.

In this rotating operation, the gear arms 36 and 37 each rotate in synchronization in opposite directions by the engaging action of the mutual gears 36a and 37a. Specifically, the first gear arm 36 rotates in the counterclockwise direction in FIG. 7A around the fifth shaft 41 as an axis of rotation. At the same time, the second gear arm 37 rotates in the clockwise direction in FIG. 7A around the seventh shaft 43 as an axis of rotation. By this synchronous action of the gear arms 36 and 37, rotating operations of the link arms 32 and 33 in the opposite directions to each other also synchronize. As a result, during the rotating operation, the coupling plate 34 rotates and moves while maintaining a position corresponding to an angular position between the chassis 12A and 12B without causing inclination etc. That is, in the hinge device 14, operations of each element on the first chassis 12A side and each element on the second chassis 12B side in rotating the chassis 12A and 12B synchronize. Thus, with the hinge device 14, the operation of the coupling plate 34 can be evenly maintained with respect to the left and right chassis 12A and 12B and the chassis 12A and 12B can be rotated with high stability. It is to be noted that, in specifications not required to enhance the stability in a rotating operation, the respective gear arms 36 and 37, the fifth shaft 41, the seventh shaft 43, the sixth shaft 46, and the eighth shaft 47 connected thereto may be omitted.

Then, the hinge device 14 has a laminated structure in which a plurality of the base plates 30 and 31 are each arranged side by side and the link arms 32 and 33 and the gear arms 36 and 37 are each sandwiched between them. Thus, the hinge device 14 can generate a predetermined rotation torque by slide resistance between the respective base plates 30 and 31, the respective link arms 32 and 33, and the respective gear arms 36 and 37 in the rotating operation. As a result, the rotating operation of the chassis 12A and 12B by the hinge device 14 is stabilized. Thus, the chassis 12A and 12B can be rotated to a 120 degree position to maintain the angular position between the chassis 12A and 12B in this state, as illustrated in FIG. 7B, for example. Then, the portable information device 10 can also be used as a Laptop PC by displaying a software keyboard etc. on a part of the display 16 on the second chassis 12B side in FIG. 7B, for example. It is to be noted that the rotation torque of the hinge device 14 may be generated by a configuration in which torque is loaded to a rotating part between the respective shafts 40 to 47 and the first base plate 30 or the first link arm 32 etc., for example.

In the storage form illustrated in FIG. 7C, the hinge device 14 has an arrangement in which the respective base plates 30 and 31 are in parallel with each other and face each other through the display 16. In this state, the first link arm 32 is in a position of having rotated most in the counterclockwise direction with respect to the first base plate 30 around the first shaft 40 as an axis of rotation. Similarly, the second link arm 33 is in a position of having rotated most in the clockwise direction with respect to the second base plate 31 around the second shaft 42 as an axis of rotation.

Therefore, the coupling plate 34 is at a position where its left and right ends are pulled in a direction of coming close to the display 16 again by the link arms 32 and 33, respectively, in the storage form. Herein, most of the coupling plate 34 including the outer peripheral end surface 34a projects outwards from the one edge portions 12Aa and 12Ba of the respective chassis 12A and 12B. On the other hand, an end surface on an inner peripheral side opposite to the outer peripheral end surface 34a is disposed to face the rear surface of the bending region 16b of the display 16 across a predetermined gap. Therefore, the hinge device 14 in the storage form is configured so as not to interfere with the display 16 while being made thinner in the X direction. Although illustrating the backbone member 18 is omitted in FIG. 7C, the outer peripheral end surface 34a of the coupling plate 34 of each hinge device 14 at both ends in the Y direction is covered by the backbone member 18 or a cover member (not illustrated) for seamlessly covering the entire rear surfaces of both chassis 12A and 12B.

It is to be noted that since the rotating operation from the storage form illustrated in FIG. 7C to the usage form illustrated in FIG. 7A is reverse operation of the above-described folding operation, its description is omitted.

As described above, in the portable information device 10 according to the present embodiment, the hinge device 14 has the first base plate 30, the second base plate 31, the first link arm 32 having the first end portion rotatably connected to the first base plate 30 through the first shaft 40, the second link arm 33 having the first end portion rotatably connected to the second base plate 31 through the second shaft 42, and the coupling plate 34 having the first end portion rotatably connected to the second end portion of the first link arm 32 through the third shaft 44 and the second end portion rotatably connected to the second end portion of the second link arm 33 through the fourth shaft 45. Then, the hinge device 14 as a whole is disposed below the display surface, under the bezel member 20 in the example of the configuration of FIG. 4, regardless of the opening/closing state of the second chassis 12B to the first chassis 12A.

Thus, in the portable information device 10, the coupling plate 34 is connected to the base plates 30 and 31 fixed to the chassis 12A and 12B through the link arms 32 and 33. Thus, in the portable information device 10, the coupling plate 34 moves so as to separate from the bending region 16b of the display 16 in the folding operation of the chassis 12A and 12B. That is, in the portable information device 10, each element of the hinge device 14 located on the outer side than the surface 16a of the display 16 is subject to a turning radius difference in folding. However, the hinge device 14 can absorb the above-described turning radius difference by the movement of the coupling plate 34 in a direction of separating from the display 16 in folding. Then, in the portable information device 10, all elements of the hinge device 14, such as the base plates 30 and 31, the link arms 32 and 33, and the coupling plate 34, or each shaft 40 etc., are disposed on the outer side than the surface 16a of the display 16. Specifically, the hinge device 14 is contained under the bezel member 20 in the above configuration example. Thus, the portable information device 10 can suppress reduction in appearance quality due to exposure of the hinge device 14 to the top surface of the chassis 12A and 12B.

The hinge device 14 may be disposed under the display 16, under the support plates 22A and 22B in the present embodiment (refer to the hinge device 14 as indicated by the dashed-two dotted line in FIG. 4). However, in this configuration, a position of the hinge device 14 is more distant from the surface 16a of the display 16 compared to the configuration in which the hinge device 14 is disposed under the bezel member 20. Thus, this configuration is influenced more significantly than the configuration in which the hinge device 14 is disposed under the bezel member 20 by a turning radius difference and an amount of movement of the coupling plate 34 has to be increased. In other words, in the above-described configuration example, the hinge device 14 can be disposed as close to the surface 16a of the display 16 as possible by disposing the hinge device 14 under the bezel member 20. For example, the hinge device 14 as indicated by the solid line in FIG. 4 is disposed at a position in which a top surface of the hinge device 14 substantially aligns with the surface 16a of the display 16. Thus, the hinge device 14 has the advantage of being capable of minimizing the amount of movement of the coupling plate 34 during folding and minimizing its thickness. The hinge device 14 may be disposed under and overlapping the bezel member 20 and the display 16.

In addition, it is a matter of course that the present invention is not limited to the embodiments described above and can be freely altered without deviating from the scope of the present invention.

In the above, the configuration in which the base plates 30 and 31 are fixed to the chassis 12A and 12B with the brackets 38 and 39, is illustrated by an example. However, the base plates 30 and 31 may be directly fixed to the chassis 12A and 12B without the brackets 38 and 39. It is to be noted that using the brackets 38 and 39 improves the attachability of the hinge device 14 to the chassis 12A and 12B and the manufacturing efficiency.

In the above, the configuration in which the backbone member 18 is used, is illustrated by an example. However, the backbone member 18 may be omitted. That is, if the hinge device 14 extends over the entire length in the Y direction, for example, the gap between the one edge portions 12Aa and 12Ba is covered by the outer peripheral end surface 34a of the coupling plates 34 disposed at narrow intervals, so that the reduction in appearance quality is minimized.

Although the portable information device 10 foldable into a double-folded state like a book is illustrated by an example in the above, the present invention can be applied to various configurations, such as a hinged double door configuration of foldably connecting respective small chassis members to right and left edge portions of a large chassis member, an S-type folding configuration of connecting respective chassis members with different folding directions to right and left edge portions of one chassis member, a J-type configuration of foldably connecting a small chassis member to either right or left edge portion of a large chassis member and the like, other than the configuration of folding chassis members of the same shape into a double-folded state, and the number of connected chassis members may be four or more.

The invention claimed is:

1. A portable information device, comprising:
a first chassis having one edge portion;
a second chassis having one edge portion adjacent to the one edge portion of the first chassis;
a hinge device rotatably connecting the one edge portions of the first chassis and the second chassis whereby the second chassis is opened/closed with respect to the first chassis;
a display seamlessly covering respective display surfaces of the first chassis and the second chassis and being foldable; and
a bezel member covering a portion of the display surfaces of the first chassis and the second chassis other than the display,
wherein the hinge device comprises:
a first base plate fixed to the first chassis;
a second base plate fixed to the second chassis;
a first link arm having a first end portion rotatably connected to the first base plate through a first shaft;
a second link arm having a first end portion rotatably connected to the second base plate through a second shaft; and
a coupling plate having a first end portion rotatably connected to a second end portion of the first link arm through a third shaft and having a second end portion rotatably connected to a second end portion of the second link arm through a fourth shaft, and
wherein the hinge device is disposed opposite a side of the display surfaces, which side is viewed by a user, regardless of whether the second chassis and the first chassis are in an opening state or in a closing state;
wherein the hinge device further comprises:
a first gear arm having a first end portion rotatably connected to the first base plate through a fifth shaft, and having a second end portion rotatably connected to the coupling plate through a sixth shaft, and having a first gear around the sixth shaft; and
a second gear arm having a first end portion rotatably connected to the second base plate through a seventh shaft, and having a second end portion rotatably connected to the coupling plate through an eighth shaft, and having a second gear around the eighth shaft, the second bear engaging with the first gear;
wherein, in a usage form:
the portable information device lies in a first plane;
the first base plate and the second base plate lie on opposite sides of a bending center line of the portable information device, which bending center line extends in a second plane which is perpendicular to the first plane;
in the first plane, the first shaft is disposed closer to the bending center line than the third shaft;
in the first plane, the second shaft is disposed closer to the bending center line than the fourth shaft;
in the first plane, the fifth shaft and the sixth shaft are equidistant from the bending center line; and
in the first plane, the seventh shaft and the eighth shaft are equidistant from the bending center line.

2. The portable information device according to claim 1, wherein the hinge device is disposed at a side of the bezel member and beside the display, which side of the bezel member is opposite another side of the bezel member viewed by the user.

3. The portable information device according to claim 1, wherein the hinge device is disposed at a side of the display which side of the display is opposite another side of the display viewed by the user.

4. The portable information device according to claim 1, wherein the hinge device connects the first chassis and the second chassis whereby the first chassis and the second chassis are foldable from the usage form, in which a top surface of the first chassis and a top surface of the second chassis face the same direction and are parallel to each other, to a storage form in which the top surfaces of the first chassis and the second chassis face each other,
the coupling plate is stored inside the first chassis and the second chassis in the usage form, and projects outward from an end surface of the one edge portions of the first chassis and the second chassis in the storage form.

5. The portable information device according to claim 1, further comprising:
a first bracket fixing the first base plate and the first chassis; and
a second bracket fixing the second base plate and the second chassis.

* * * * *